US008874943B2

(12) United States Patent
Majumdar et al.

(10) Patent No.: US 8,874,943 B2
(45) Date of Patent: Oct. 28, 2014

(54) ENERGY EFFICIENT HETEROGENEOUS SYSTEMS

(75) Inventors: Abhinandan Majumdar, Edison, NJ (US); Srihari Cadambi, Princeton, NJ (US); Srimat T Chakradhar, Manalapan, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 602 days.

(21) Appl. No.: 13/079,808

(22) Filed: Apr. 4, 2011

(65) Prior Publication Data

US 2012/0079298 A1 Mar. 29, 2012

Related U.S. Application Data

(60) Provisional application No. 61/346,727, filed on May 20, 2010.

(51) Int. Cl.
| | | |
|---|---|---|
| G06F 1/32 | (2006.01) | |
| G06F 9/50 | (2006.01) | |
| G06F 9/46 | (2006.01) | |
| G06F 11/30 | (2006.01) | |
| G06F 11/34 | (2006.01) | |

(52) U.S. Cl.
CPC ...... *G06F 11/3409* (2013.01); *G06F 2209/509* (2013.01); *Y02B 60/142* (2013.01); *G06F 9/5094* (2013.01); *G06F 1/3293* (2013.01); *Y02B 60/165* (2013.01); *Y02B 60/167* (2013.01); *G06F 1/3206* (2013.01); *G06F 9/5066* (2013.01); *G06F 1/329* (2013.01)
USPC ............ 713/320; 713/300; 713/340; 718/100

(58) Field of Classification Search
None
See application file for complete search history.

(56) References Cited

U.S. PATENT DOCUMENTS

| 8,284,205 | B2 * | 10/2012 | Miller et al. ................... 345/502 |
|---|---|---|---|
| 2006/0080076 | A1 * | 4/2006 | Lahiri et al. ..................... 703/18 |
| 2008/0204460 | A1 * | 8/2008 | Marinkovic et al. ........... 345/502 |
| 2009/0304268 | A1 * | 12/2009 | Cadambi et al. ................ 382/159 |
| 2010/0088490 | A1 * | 4/2010 | Chakradhar et al. ............. 712/34 |
| 2010/0095152 | A1 * | 4/2010 | Darrington et al. .............. 714/19 |
| 2011/0173155 | A1 * | 7/2011 | Becchi et al. .................. 707/610 |
| 2012/0079298 | A1 * | 3/2012 | Majumdar et al. ............. 713/320 |

OTHER PUBLICATIONS

Tomoaki Hamano, et al., Power-Aware Dynamic Task Scheduling for Heterogeneous Accelerated Clusters, IEEE International Symposium on Parallel & Distributed Processing, 2009. IPDPS 2009.

Chi-Keung Luk, et al., Qilin: Exploiting Parallelism on Heterogeneous Multiprocessors with Adaptive Mapping, (2009), 42nd Annual IEEE/ACM International Symposium on Microarchitecture, 2009. MICRO-42.

Cédric Augonnet, et al., Data-Aware Task Scheduling on Multi-Accelerator based Platforms (2010), IEEE 16th International Conference on Parallel and Disftibuted Systems (ICPADS), 2010.

* cited by examiner

*Primary Examiner* — Tanh Nguyen
(74) *Attorney, Agent, or Firm* — Joseph Kolodka

(57) ABSTRACT

Low-power systems and methods are disclosed for executing an application software on a general purpose processor and a plurality of accelerators with a runtime controller. The runtime controller splits a workload across the processor and the accelerators to minimize energy. The system includes building one or more performance models in an application-agnostic manner; and monitoring system performance in real-time and adjusting the workload splitting to minimize energy while conforming to a target quality of service (QoS).

15 Claims, 2 Drawing Sheets

ENERGY EFFICIENT HETEROGENEOUS SYSTEMS

The present application claims priority to Provisional Application Ser. No. 61/346,727 filed May 20, 2010, the content of which is incorporated by reference.

BACKGROUND

This application relates to energy efficient computation.

Embedded learning and classification applications are computationally intensive and process large amounts of real-time data while balancing stringent Quality of Service (QoS) constraints under tight power budgets. These include applications in the areas of transportation, healthcare, robotics, aerospace and defense. For instance, one in-vehicle system monitors real-time driving events, analyzes risks, and suggests improvement over driving habits. Such a system requires real-time responsiveness while processing and analyzing continuous streams of data. Cars also continuously monitor and analyze internal sensor data in order to predict failures and reduce recalls. Another example is face, object and action detection in surveillance and store cameras; stores and advertising agencies analyze shopper behavior to gauge interest in specific products and offerings.

Such learning and classification applications are computation and data-intensive and are generally data parallel in nature. In data centers, such workloads can rely on clusters of high-performance servers and GPUs to meet the stringent performance constraints and dynamic scalability. For example, GPU based implementations of learning-algorithms like Convolutional Neural Network (CNN) and Support Vector Machines (SVM) have been published that meets their high-performance requirements. However, in embedded situations such as automobiles and store cameras, a CPU+GPU server compute node is too power hungry. Another approach to designing low-power servers has been to consider embedded processors.

There are several runtime proposals to map applications to heterogeneous systems, but few consider energy. OpenCL, for instance, provides a common programming platform for both CPU and GPU but burdens the programmer with application-distribution. IBM's OpenMP for Cell is similar, while Intel's Merge provides a manual mapping of the application. Yet other conventional systems provide a runtime-support for legacy applications improving the overall application-performance by deferring the intermediate data-transfer before scheduling to a different coprocessor. Harmony schedules the application in an automated manner by predicting the performance of the application's kernels, but they do not split a single kernel among multiple accelerators, and do not focus on energy. Other conventional systems take an adaptive (dynamic) approach to improve performance on a system with one GPU and assume a linear-model to decide the optimal partitioning of an application for a server-system consisting CPU and GPU.

SUMMARY

In one aspect, a low-power system includes a general purpose processor; a plurality of accelerators; and a power-aware runtime controller to split workload across the processor and the accelerators to minimize energy, wherein the runtime controller builds performance models in an application-agnostic manner and monitors system performance in real-time.

In another aspect, a low-power method is disclosed to execute an application software on a general purpose processor and a plurality of accelerators by splitting a workload across the processor and the accelerators to minimize energy; building one or more performance models in an application-agnostic manner; and monitoring system performance in real-time and adjusting the workload splitting to minimize energy while conforming to a target quality of service (QoS).

In yet another aspect, a low-power heterogeneous system includes a general purpose processor and multiple accelerators; and a power-aware runtime that builds performance models in an application-agnostic manner; splits workloads across multiple accelerators to minimize energy; monitors system (accelerator) performance in real-time; and fine-tunes the performance model based on actual execution, in order to maintain QoS.

Advantages of the preferred embodiment may include one or more of the following. The system is highly energy efficient. The power-aware runtime for this system automatically split workloads across the multiple accelerators to minimize energy while satisfying performance constraints. The energy-benefits achieved by the runtime results in an optimal-mapping that balances high performance with low power consumption.

The system optimizes performance using call interception, which operates transparently in comparison with an application programming interface (API) where the programmer is actively tweaks the code to achieve the desired performance. The system can handle multiple accelerators including CPU, GPU and FPGA elements. Further, the accelerator performance monitor continuously monitors performance in order to fine tune the model.

DESCRIPTION

Figure 1:
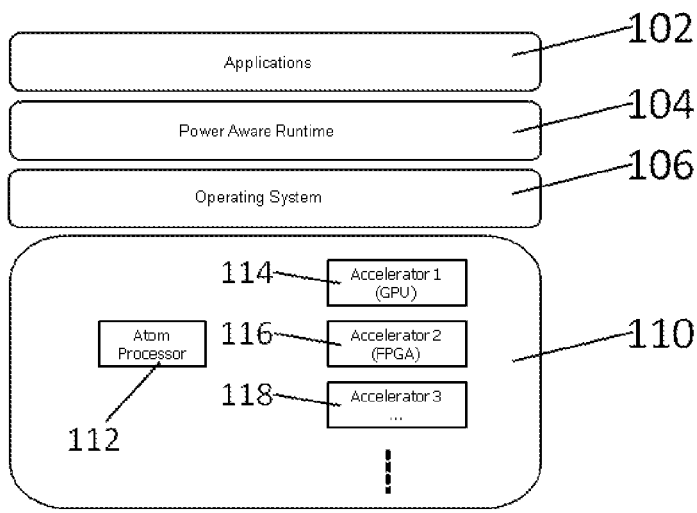
FIG. 1 shows exemplary low-power heterogeneous system architecture for embedded learning and classification.

FIG. 1 shows exemplary low-power heterogeneous system architecture for embedded learning and classification. A layer of applications 102 communicates with a power-aware runtime module 104 which in turn interacts with an operating system 106. The software is executed by a low-power heterogeneous hardware 110 that includes a processor 112 and one or more accelerators 114-118.

In one embodiment, the accelerators are slaves attached to the host processor by means of a communication link such as the PCI bus. They have no direct access to system resources such as the disk and network, and they do not share memory with the host. In one implementation, the low-power heterogeneous system includes a dual-core Intel® Atom™ processor 330 coupled with 16 Core GeForce 9400M (MCP79) chipset as ION GPU, and an ASUS AT3N7A-I motherboard. This implementation uses a Xilinx Virtex 5 SX240T board with 256 FPGA-based DSP elements organized as parallel multiply-accumulators to perform matrix-multiplication. This type of semi-custom accelerator differs from the GPU in terms of its programmability (the GPU is more easily programmed). The FPGA also has more "PEs" than the GPU in theory and may be faster for certain operations despite a slower clock speed. The power of the entire system running no application is referred to as $P_{no\_app}$.

The low power heterogeneous hardware 110 supports embedded learning and classification tasks. The system consists of an embedded processor such as the Atom with multiple domain specific accelerators (such as low-end GPUs, FPGAs, among others). The system includes a power-aware runtime module 104, which is the system software layer above standard operating system. The runtime module 104 can intelligently schedule workloads to minimize overall energy while maintaining performance QoS.

The system minimizes energy targeted for an embedded platform by dynamically splitting the algorithm to the system's accelerators. Individual processor power numbers are taken into account while mapping the application. One embodiment applies a linear performance model, and fine-tunes the model as more samples are collected until the desired QoS is satisfied. Non-linear performance models are contemplated as well.

Figure 2:
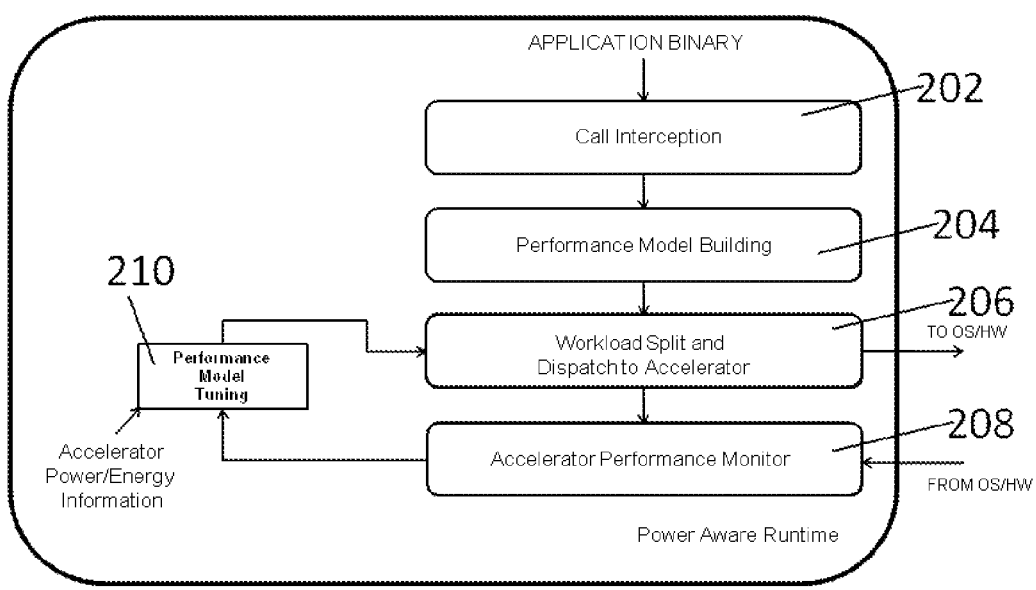
FIG. 2 shows the power-aware runtime in more detail.

FIG. 2 shows the power-aware runtime in more detail. Application binary files are provided to a call interception service 202 when the application is executed. The application is sent to a performance model generator 204. With a dispatcher 206, the workload is split and dispatched to the accelerators 114-118. A performance monitor 208 receives the workload assignment from the dispatcher 206 and monitoring data from the hardware 110, and sends the accelerator power and energy information to a performance model tuner 210, which provides feedback to the dispatcher 206. The runtime intercepts calls to well-known computational kernels. It then builds an application-agnostic performance model that estimates the time for different portions of this kernel on each accelerator. It then figures out the best partitioning of the kernel across the accelerators to minimize energy. The system performance is monitored continuously, and if it falls short of the expected QoS, the runtime fine-tunes the model, trading off energy for performance.

Figure 3:
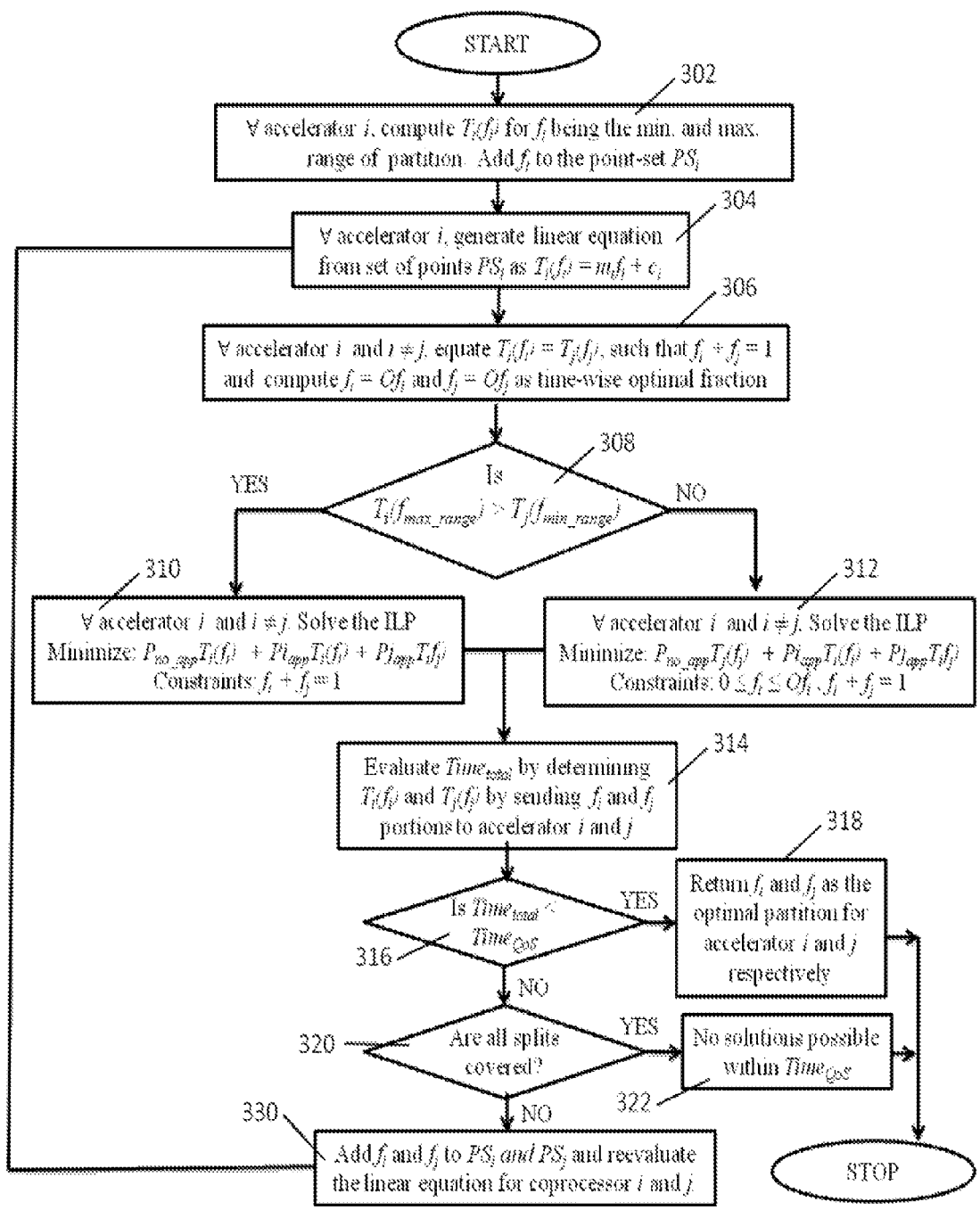
FIG. 3 shows an exemplary power-aware runtime process.

FIG. 3 shows a detailed flowchart depicting the operation of the proposed power-aware runtime. As an overview, for each accelerator in the system, the runtime sends different sizes of the kernel in the workload, and measures the time taken by the accelerator. It then constructs a linear model based on the collected data. Once it has an execution time model for each accelerator, the runtime solves for minimum energy, i.e., it figures how the workload should be partitioned across the accelerators in order to minimize energy. If that partition solution does not meet performance constraints (which the runtime measures on the actual system), the model is tweaked as detailed below.

In one embodiment, the runtime module 104 expresses the mapping-problem as an integer-linear-program. The goal of the runtime is to minimize the system's energy consumption under the constraint that a) entire problem is solved; b) a given performance QoS is achieved. With the power profile of the system, the mapping-problem is expressed as an integer linear program where Energy is minimized:

$$\text{Energy} = (P_{no\_app} \times \text{Time}_{total}) + \sum_{i=1}^{N} (Pi_{app} \times T_i(f_i))$$

Under the constraints:

$$\sum_{i=1}^{N} f_i = 1$$

$$\text{Time}_{total} = \max_{1 \leq i \leq N} (T_i(f_i)) \leq \text{Time}_{QoS}$$

Where:
$P_{no\_app}$ is system-power when no application is running,
$Pi_{app}$ is power of accelerator l when application "app" runs on l,
$T_i(f_i)$ is time to execute $f_i$ portion of algorithm by accelerator i,
$\text{Time}_{total}$ is total execution-time,
$\text{Time}_{QoS}$ is expected QoS for the algorithm
$f_i$ is the fraction of algorithm given to accelerator i,
N is total number of accelerators in the system.

FIG. 3 shows the flowchart of the runtime. The runtime creates a point-set PS by running the process of FIG. 3 for each accelerator for a few different workload partitions. Based on these points $PS_i$ for accelerator i, the runtime generates $T_i(f_i) = m_i f_i + c_i$ as a linear function of partition $f_i$, where $m_i$ is the slope, and $c_i$ is the y-intercept.

The runtime computes the partition for minimum-time by equating the execution-time of all the accelerators to be the same i.e. $T_i(f_i) = T_j(f_j)$ such that $f_i + f_j = 1$. Based on the optimal fractions, $f_i = Of_i$ and $f_j = Of_j$, the runtime solves separate integer-linear-problems for two ranges using simplex algorithm in one implementation.

1) If $T_i(f_{max\_range}) > T_j(f_{min\_range})$: In this case, total execution time $\text{Time}_{total}$ equals $T_i(f_i)$ for the range $Of_i \leq f_i \leq 1$. Therefore, the runtime solves the following objective function:

Minimize:

$$\text{Energy} = (P_{no\_app} \times T_i(f_i)) + (Pi_{app} \times T_i(f_i)) + \sum_{j=1, i \neq j}^{N} (Pj_{app} \times T_j(f_j))$$

Under the constraints:

$$\sum_{i=1}^{N} f_i = 1$$

$$Of_i \leq f_i \leq 1$$

The Simplex algorithm identifies the largest constant-term in the objective-function that contributes most in maximizing or minimizing the value of the function. In this case, the algorithm minimizes $f_i$ or $f_j$ for which $(P_{no\_app} + Pi_{app})$ or $Pj_{app}$s is the largest, and obtains an optimal partition $f_i$ and $f_j$ for the range $Of_i \leq f_i \leq 1$.

2) If $T_i(f_{max\_range}) < T_j(f_{min\_range})$: In this case, total execution time $\text{Time}_{total}$ equals $T_j(f_j)$ for the range $0 \leq f_i \leq Of_i$. Using simplex algorithm for integer-linear-program, the runtime solves the following objective function for $f_i$ and $f_j$ for the range $0 \leq f_i \leq Of_i$:

Minimize:

$$\text{Energy} = (P_{no\_app} \times T_j(f_j)) + (Pj_{app} \times T_j(f_j)) + \sum_{i=1, i \neq j}^{N} (Pi_{app} \times T_i(f_i))$$

Under the constraints:

$$\sum_{i=1}^{N} f_i = 1$$

$$0 \leq f_i \leq Of_i$$

Based on the values of $f_i$ and $f_j$ for both the ranges, the runtime evaluates the objective function and chooses that fraction which gives the minimum-energy value. To test QoS, the runtime actually runs the application on the accelerator i and j with fractions $f_i$ and $f_j$. If the runtime meets the QoS, the partition numbers $f_i$ and $f_j$ are reported. Otherwise, the linear equation is regenerated with $f_i$ and $f_j$ being added to the $PS_i$ and $PS_j$ of coprocessor i and j respectively. The entire procedure is then repeated until QoS is met. The runtime reports "no-solution within QoS" if all integer-partitions are covered.

Turning now to FIG. 3, for each accelerator, the process determines $T_i(f_i)$ for the minimum and maximum range of partition (302). Next, for each accelerator, the process generates a linear equation from the set of points PS (304). Next, the process determines $Of_i$ as a time-wise optimal fraction (306). The process determines if $T_i(f_{max\_range}) > T_j(f_{min\_range})$ (308). If true, the process solves the integer linear program (310) and otherwise solves the linear program (312). From either 310 or 312, the process evaluates the total time (314) and checks if the total time is less than the time needed to provide quality of service (316). If so, f is returned as the optimal partition for the particular accelerator (318) and the process exits. Alternatively, the process checks to see if all splits have been processed (320). If so, the process indicates that no solutions are possible give the QoS constraint (322) and exits. From 320, if not all splits have been processed, the process adds f(i) and f(j) to PS(i) and PS(j) and reevaluates the linear equation for the accelerator l and j (330), and loops back to 304 to continue processing.

The runtime iteratively explores the space of possible workload distributions to the accelerators, builds a dynamic performance model and uses it to minimize system energy consumption. If the resulting workload distribution fails to meet performance QoS constraints, the runtime heuristically trades-off energy for performance until the QoS is achieved. Advantages of the preferred embodiment may include one or more of the following. The system is highly energy efficient. The power-aware runtime for this system automatically split workloads across the multiple accelerators to minimize energy while satisfying performance constraints. The energy-benefits achieved by the runtime results in an optimal-mapping that balances high performance with low power consumption.

The heterogeneous system for embedded learning and classification applications and the power-aware dynamic runtime exploits the fact that data parallel applications may perform better if they are split across multiple accelerators. More significantly, splitting an application to minimize execution time by itself is not always energy-efficient. The runtime for performing energy-efficient mapping thus is cognizant about individual accelerator performance as well as power-numbers under idle and busy state of application execution.

The runtime is application-independent, i.e., it builds a performance model in an application-agnostic manner by collecting timing samples during a training period. The runtime assumes a linear model that is progressively fine-tuned as more samples are collected. The runtime collects samples as and when necessary until it meets the QoS, thereby minimizing the overhead in collecting extra samples. With multiple accelerators, a significant decrease in energy-consumption is achieved compared to the application solely running on one of the accelerators. With our workload partitioning process, our runtime achieves partition near energy-optimal mapping under given performance QoS constraints.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A low-power system to execute an application software, comprising
    a general purpose processor;
    a plurality of accelerators; and
    a power-aware runtime controller to split workload from the application software across the accelerators to minimize energy, wherein the runtime controller builds performance models in an application independent manner and monitors system performance in real-time,
wherein the runtime controller minimizes $$\text{Energy} = (P_{no\_app} \times \text{Time}_{total}) + \sum_{i=1}^{N}(Pi_{app} \times T_i(f_i))$$

under the constraints:

$$\sum_{i=1}^{N} f_i = 1$$

$$\text{Time}_{total} = \max_{1 \leq i \leq N}(T_i(f_i)) \leq \text{Time}_{QoS}$$

where:
$P_{no\_app}$ is system-power when no application is running,
$Pi_{app}$ is power of accelerator i when a fraction $f_i$ of application "app" runs on i,
$T_i(f_i)$ is time to execute fraction $f_i$ of application by accelerator i,
$\text{Time}_{total}$ is total execution-time,
$\text{Time}_{QoS}$ is time to meet expected QoS for the application,
$f_i$ is a fraction of application given to accelerator i,
N is total number of accelerators.

2. The system of claim 1, wherein the at least one of the accelerators comprises one of: a graphic processing unit (GPU), a field programmable gate array (FPGA), an application specific integrated circuit (ASIC), a custom device.

3. The system of claim 1, wherein the runtime controller comprises a call interceptor intercepting calls to the application software and wherein the runtime controller optimizes the application software for the accelerators.

4. The system of claim 1, wherein the runtime controller comprises a performance model builder to analyze the application software.

5. The system of claim 1, wherein the runtime controller comprises a performance monitor coupled to the accelerators and to a workload dispatcher.

6. The system of claim 1, wherein the runtime controller comprises a performance model tuner coupled to a performance monitor and to a workload dispatcher.

7. The system of claim 6, wherein the runtime controller fine-tunes a performance model based on actual execution to maintain quality of service (QoS).

8. The system of claim 1, wherein the runtime controller uses a linear model that is progressively fine-tuned as samples are collected.

9. A low-power method to execute an application software on a general purpose processor and a plurality of accelerators; the method comprising:
    splitting a workload from the application software across the accelerators with a workload dispatcher to minimize energy,
    building one or more performance models in an application-independent manner;
    monitoring system performance in real-time and adjusting the workload splitting to minimize energy while conforming to a target quality of service (QoS); and
    minimizing:

$$\text{Energy} = (P_{no\_app} \times \text{Time}_{total}) + \sum_{i=1}^{N}(Pi_{app} \times T_i(f_i))$$

under constraints:

$$\sum_{i=1}^{N} f_i = 1$$

$$\text{Time}_{total} = \max_{1 \leq i \leq N}(T_i(f_i)) \leq \text{Time}_{QoS}$$

where:
$P_{no\_app}$ is system-power when no application is running,
$Pi_{app}$ is power of accelerator i when a fraction $f_i$ of application "app" runs on i,
$T_i(f_i)$ is time to execute fraction $f_i$ of application by accelerator i,
$\text{Time}_{total}$ is total execution-time,
$\text{Time}_{QoS}$ is time to meet expected QoS for the application,
$f_i$ is a fraction of application given to accelerator i,
N is total number of accelerators.

10. The method of claim 9, wherein the at least one of the accelerators comprises one of: a graphic processing unit (GPU), a field programmable gate array (FPGA), an application specific integrated circuit (ASIC), a custom device.

11. The method of claim 9, comprising intercepting calls to the application software and optimizing the application software for the accelerators.

12. The method of claim 9, comprising determining a partition for minimum runtime-time by equating execution-time of all the accelerators to be the same.

13. The method of claim 9, wherein the runtime controller models performance of the accelerators.

14. The method of claim 13, comprising fine-tuning the performance models based on actual execution to maintain quality of service (QoS).

15. The method of claim 9, comprising applying a linear model that is progressively fine-tuned as samples are collected.

* * * * *